United States Patent [19]

Savich

[11] Patent Number: 4,610,653
[45] Date of Patent: Sep. 9, 1986

[54] HEAT SEALING AND CUTTING MEANS

[75] Inventor: Peter P. Savich, Long Meadow, Mass.

[73] Assignee: Union Carbide Corporation, Danbury, Conn.

[21] Appl. No.: 729,363

[22] Filed: May 1, 1985

[51] Int. Cl.[4] .................. B31B 23/14; B26D 7/10; B26F 3/12; B32B 31/18
[52] U.S. Cl. .................. 493/470; 493/203; 493/341; 83/171; 83/651.1; 83/581.1; 156/515
[58] Field of Search ............. 493/203, 341, 470; 83/171, 651.1, 581.1; 156/515

[56] References Cited

U.S. PATENT DOCUMENTS

| | | | |
|---|---|---|---|
| 2,726,706 | 12/1955 | Hakomaki | 156/515 |
| 2,737,859 | 3/1956 | Allison et al. | 493/194 |
| 3,199,388 | 8/1965 | Redfield | 83/16 |
| 3,253,122 | 5/1966 | Kochmer et al. | 83/151 |
| 3,262,833 | 7/1966 | Zelnick | 493/341 |
| 3,297,856 | 1/1967 | Gershon | 83/171 |
| 3,756,111 | 9/1973 | Weidenmiller | 83/651.1 |
| 4,125,047 | 11/1978 | Martin | 83/581.1 |
| 4,301,702 | 11/1981 | Collier | 83/862 |

Primary Examiner—Francis S. Husar
Assistant Examiner—William E. Terrell
Attorney, Agent, or Firm—D. J. Terminello

[57] ABSTRACT

A hot wire has one end mounted on a pivotally supported arm which is biased to keep the wire straight and taut. The end of the wire is bent to an L-shape and is rigidly attached to the arm. Between the bend and the point of attachment, the wire is formed with a flexible portion which expands and contracts to compensate for pivotal movement of the support arm.

7 Claims, 3 Drawing Figures

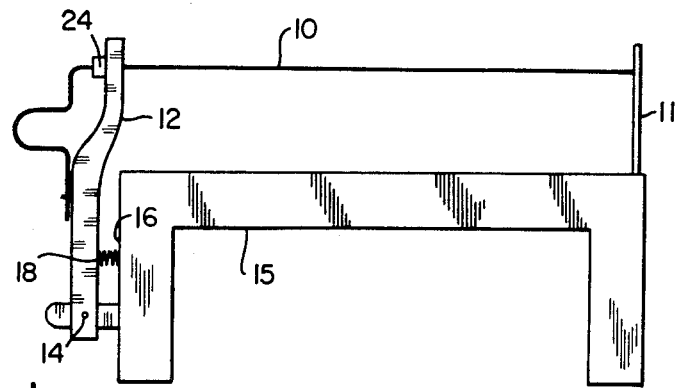
FIG. 1
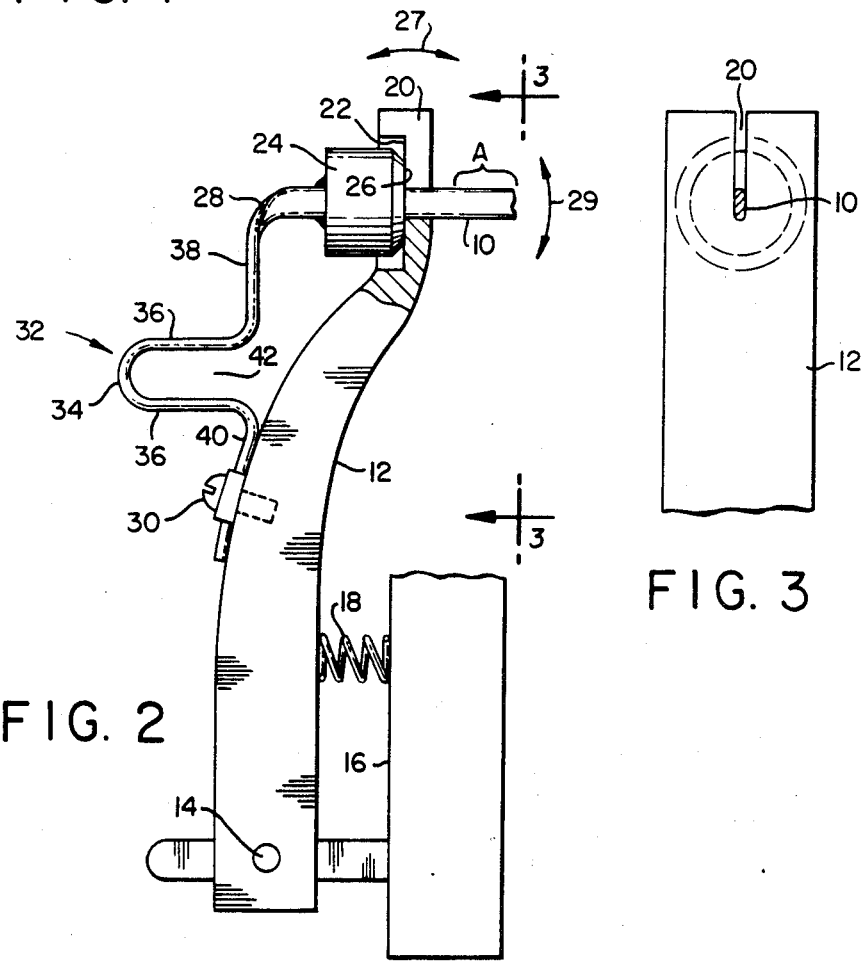
FIG. 2
FIG. 3

HEAT SEALING AND CUTTING MEANS

BACKGROUND OF THE INVENTION

The present invention relates generally to heat sealing and cutting of thermoplastic films to make plastic bags or the like. A sealing and cutting element, usually in the form of a resistance wire heated by the passage of the electric current, is used to sever and seal the thermoplastic film to form an edge of the bag. The present invention, in particular, relates to a wire support which keeps the wire straight and taut and which minimizes the effects of bending fatigue stresses on the wire.

To make the bag, a double layer of a thermoplastic film is held between clamp members. These members are closely spaced so as to form a narrow canyon. The electrically heated resistance wire moves through the canyon to contact and pass through the web thereby severing and sealing the web to form to a side edge of the bag. During passage through the canyon, the wire must remain straight and taut. If the wire slackens it may contact the side of the canyon which may damage the wire or cause an electrical short.

During the bag making operation the wire is repeatedly heated and cooled. Accordingly it is common in the art to employ springs or other tension control means to maintain the wire straight and taut as it expands and contracts responsive to the repeated cycles of heating and cooling. Where there is a space limitation at the ends of the wire, tension can be maintained by supporting each end of the wire on an upright pivotable arm. The arms are biased to pivot in opposite directions away from the center of the wire to maintain tension on the wire. The drawback of this wire support arrangement is that as the support arms pivot to maintain tension, the wire is subject to a bending moment resulting in stress adjacent the point of attachment to the support arm. Repeated bending at this point, as the arm attempts to maintain tension on the wire, subjects the wire to fatigue failure. This is especially true where the wire is relatively stiff and inflexible, as for example where the wire is rectangular or otherwise elongated in cross section with the narrow side representing the film engaging surface of the wire.

In the present invention there is provided a support arrangement for a heat sealing and severing wire which prevents stress concentration adjacent an attachment point of the wire to a pivotable support arms. This is accomplished by forming the wire so it has a relatively flexible portion and then rigidly supporting the wire so that stresses are referred to this relatively flexible portion. Stresses are distributed over the flexible portion and results in improved resistance to fatigue failures of the wire from these bending stresses.

SUMMARY OF THE INVENTION

In one aspect, the present invention is characterized by a heat sealing and cutting means for thermoplastic material comprising:

(a) an elongated electrically heated sealing and cutting wire having a load bearing surface extending normal to the longitudinal axis of said wire, and an end portion adjacent said surface bent from said longitudinal axis in a generally L-shape, the bend defining said L-shape being relatively inflexible;

(b) a pivotable arm supporting said wire, said arm having a load bearing surface engagable against said load bearing surface on said wire and said wire end portion being rigidly attached to said arm at a longitudinal location spaced from said bend;

(c) bias means urging said arm to pivot in a direction which maintains said load bearing surfaces in engagement and keeps said wire taut as it expands and contracts responsive to the heating and cooling of said wire; and (d) said wire end portion, between said inflexible bend and said rigid attachment having the form of a generally U-shaped open loop, the sides of which flex open or close responsive to the pivotal movement of said arm.

DESCRIPTION OF THE DRAWINGS

FIG. 1 is an elevation view showing the heat sealing and cutting means of the present invention;

FIG. 2 is an evaluation view on an enlarged scale partly broken away and in section showing in greater detail the mounting of one end of the heat sealing and cutting means of the present invention; and FIG. 3 is a view taken generally lines 3—3 FIG. 1.

DESCRIPTION OF THE PREFERRED EMBODIMENTS

Referring to the drawings, FIG. 1 shows an elongated electrically heated resistance wire 10. The wire is clamped at one end to a fixed upright support 11. The other end of the wire is supported by a pivotally mounted upright arm 12.

Arm 12 is pivotally supported at 14 to a wall 16 of a carrier 15. Bias means, such as a spring 18, is disposed between the wall and the arm for urging the arm to pivot in a counterclockwise direction and away from the fixed support 11 as viewed in FIG. 1.

FIG. 2 shows that the upper end of arm 12 is provided with a vertical slot 20. The width of the slot is sufficient to accommodate the wire 10. In addition the outboard facing surface of the arm adjacent the slot is provided with a recessed portion or seat 22.

Attached to wire 10 is a grommet 24. The grommet is receivable in seat 22 and provides the wire with a load bearing surface 26 that extends generally perpendicular to the longitude axis of the wire. This surface 26 on the grommet contacts a complementary load bearing surface defined by seat 22. The bias means 18, which urges the support arms 12 to pivot in a direction away from fixed support 11, causes the load bearing surfaces to remain in contact and keeps the wire straight and under tension as the wire expands and contracts responses to changes in the wire temperature. These changes occur each sealing and cutting cycle as the wire gives up heat to seal and cut the thermoplastic film. Heating and cooling may occur several times a minute depending upon the rapidity of the cycle.

As the arm 12 tends to pivot about its connection 14 to maintain tension on the wire, the upper end of the arm moves through an arc as indicated by arrow 27. Because the wire is held straight by the tension exerted by arm 10 pulling against the fixed support 11, the wire tends to blend in the direction indicated by arrow 29. This subjects the wire to bending stresses in the area adjacent support arm 10. This area of the wire, indicated at A, experiences repetitive relatively localized bending stresses. The concentration of these stresses contributes to the fatigue failure of the wire. Bending in this area is particularly detrimental if the wire has an elongated cross section, and the wire is oriented so bending occurs in a plane perpendicular to its narrow dimension (FIG. 2).

The present invention is intended to compensate for this problem. In this respect, FIGS. 1 and 2 show that the wire has a relatively long end portion which extends through the grommet and is bent in a generally L-shape. The bend 28 which defines the L-shape is a sharp bend and is relatively inflexible. At this point the wire is also twisted (FIG. 2) so that its wider side surface can be positioned flat against, and rigidly attached to, the support arm 12 by any suitable means such as a screw 30. An electrical conductor (not shown) can be attached to the wire at screw 30 or, if the arm 12 is made of a electrically conductive material, electrical energy can be introduced at some other point along the arm.

The L-shaped portion of the wire between the relatively inflexible bend 28, and the point of rigid attachment to arm 12 at screw 30 is formed with a U-shaped open loop generally indicated at 32. The base portion 34 of the loop is rounded which provides some flexibility even to the relatively stiff material of the wire. The sides 36 of the loop are likewise formed with smooth curves which provides some flexibility in the areas where the sides merge into the straight segments 38, 40 of the L-shaped end portion of the wire.

As described, the L-shaped end portion is relatively inflexible at the sharp bend 28 at one end and at the point of rigid attachment to arm 12 by screw 30 at the other end. Intermediate these two ends however, the generally U-shaped loop 32 in the wire provides a relatively flexible portion. In this respect the sides of the open U-shape can flex open or close and the curve of the U-shape is such that there is no localized concentration of stresses. Instead, the bending stresses are distributed over the length of the U-shaped loop 32.

In operation support arm 12 at the end of wire 10 is biased in a direction away from fixed support 11 to maintain tension on the wire and to keep the wire straight and taut. This tension is maintained by the contact of the load bearing surfaces presented by the grommet 24 and the complementary surface of the seat 22, these surfaces being oriented in a plane perpendicular to the longitudinal axis of the wire.

When the wire heats, it expands. In order to maintain tension, the arm 12 shown in FIG. 1 will pivot counterclockwise under the influence of spring bias 18. As the arm moves in a counterclockwise direction bending forces are exerted on the wire in the direction of arrow 29 and are concentrated in the area indicated at A. However, this section of the wire is much more rigid and more inflexible than the section of the wire defined by the U-shaped loop 32. Consequentially, the stiffness of the wire provided by bend 28, straight portions 38, 40 and the rigid attachment to arm 12 at screw 30, will refer the bending to the U-shaped loop 32 so bending will occur here and not in the region of the wire indicated at A. Bending at the U-shape, as the wire elongates, is manifest by the sides 36 flexing in a direction which narrows the opening 42 of the U-shaped loop.

When the wire cools and contracts, arm 12 will be drawn clockwise against the bias spring of 16. This will cause the sides 36 of the U-shaped loop 32 spread apart and widen the opening 42. In this fashion the bending stress on the wire are referred to the area defined by the U-shaped loop 37 which then flexes to relieve these stresses. The opening and closing of the loop in effect compensates for changes in the length of the wire 10. Since the bending stresses are distributed over the U-shape, and are not concentrated at the relatively rigid and inflexible portions of the wire, failure due to fatigue is reduced.

Accordingly, the present invention provides a heat sealing and cutting means which is less susceptible to failure due to fatigue caused by repetitive expansion and contraction of the electrically heated sealing and cutting means. In particular, the present invention provides a mounting arrangement for an electrically heated sealing and cutting wire which supports the wire so as to maintain the wire under tension to keep it straight and taut during repetitive heating and cooling cycles. The design of the mounting arrangement is such that the wire is rigidly fixed at its ends and it has a relatively flexible U-shaped portion arranged so that bending stresses at the inflexible portions of the wire are referred to the more flexible U-shaped portion of the wire.

Only one pivotally mounted support arm 12 is shown. However, it should be appreciated that each end of the wire can be supported by a pivotally mounted support arm. In this case, the middle of the wire would be clamped to a fixed support and each arm 12 would be biased in opposite directions so each would pull the wire in a direction away from the fixed support.

Having described the invention in detail, what is claimed as new is:

1. A heat sealing and cutting means comprising:
   (a) a pair of pivotally supported and longitudinally spaced upright arms;
   (b) an electrically heated sealing and cutting wire extending between the upright ends of said arms;
   (c) said arms and wire each having complimentary load bearing surfaces which contact one against the other in a plane normal to the longitudinal axis of said wire, and said arms being biased to pivot in opposite arcuate directions so as to maintain said load bearing surfaces in contact and said wire under tension as said wire expands and contracts responsive to changes in wire temperature;
   (d) said wire having end portions which are sharply bent from said longitudinal axis and which extend along said arms and which are rigidly fixed to said arms at some point spaced from said sharp bend, said wire at the sharp bend being relatively inflexible and subject to fatigue failure at a point adjacent said load bearing surfaces as said arms pivot to maintain said wire taut; and
   (e) each end portion; between said sharp bend and the point of rigid attachment to said arm, being formed in an open, generally U-shaped loop, the sides of which flex open or close to accommodate pivoting movement of said arms thereby relieving fatigue stresses adjacent said load bearing surfaces 2. A heat sealing and cutting means for thermoplastic material comprising:
   (a) an elongated electrically heated sealing and cutting wire having an end portion bent from the longitudinal axis of said wire so as to form a generally L-shaped relatively inflexible bend and said wire having adjacent said bend a load bearing surface extending normal to said longitudinal axis;
   (b) a wire support including a pivotable arm, said wire end portion extending generally along said arm and said arm having a load bearing surface engageable against said load bearing surface on said wire;
   (c) bias means operatively connected to said arm for urging said arm to pivot in a direction which maintains the engagement of said load bearing surfaces and keeps said wire taut as it expands and contracts responsive to the heating and cooling of said wire;

(d) means rigidly attaching said wire end portion to said pivotable arm at a location spaced along said end portion and remote from said bend; and (e) said wire end portion, in a section between said inflexible bend and said location of rigid attachment to said arm, having a generally U-shaped form with a rounded base and straight sides extending from the rounded base, which sides flex open or close responsive to the pivotal movement of said arm.

3. A heat sealing and cutting means as in claim 2 wherein the straight sides of the U-shaped form are bent in smooth curves into straight segments of said end portion, one of said segments being rigidly fixed to said arm and another of said straight segments terminating in said generally L-shaped, relatively inflexible bend.

4. A heat sealing and cutting means as in claim 2 wherein said arm has a seat at one end and said load bearing surface on said wire is receivable in said seat.

5. A heat sealing and cutting means as in claim 4 including a grommet fixed to said wire, said grommet being receivable in said seat and said wire end portion extending through said grommet.

6. A heat sealing and cutting means as in claim 4 wherein said wire is generally rectangular in cross section and is oriented so the narrow side of said wire is its sealing and cutting surface and said wire is twisted adjacent said bend so as to orient the wide surface of said wire against said arm.

7. A heat sealing and cutting means as in claim 6 wherein the open portion of said U-shaped loop is oriented facing said arm and the sides of said U-shaped loop flex to narrow said opening as said wire expands and flex to widen said opening when said wire contracts.

* * * * *